United States Patent [19]
Diebel

[11] 3,929,538
[45] Dec. 30, 1975

[54] METHOD OF ASSEMBLING A THERMOPLASTIC SLEEVE ONTO A PIPE OR THE LIKE

[75] Inventor: Leverne G. Diebel, Cuyahoga Falls, Ohio

[73] Assignee: Clow Corporation, Oak Brook, Ill.

[22] Filed: June 14, 1974

[21] Appl. No.: 479,743

[52] U.S. Cl. ............. 156/86; 156/293; 156/304; 264/327; 285/223; 285/381
[51] Int. Cl.² ......................................... B29D 23/01
[58] Field of Search ....... 156/86, 85, 157, 158, 160, 156/165, 295, 296, 293, 294, 303.1, 282, 322; 264/89, 322, 92, 327, 237, 348; 285/381, 223, DIG. 10; 138/DIG. 1, DIG. 5, 120, 155

[56] References Cited
UNITED STATES PATENTS

| | | | |
|---|---|---|---|
| 3,315,986 | 4/1967 | Quick | 285/381 |
| 3,342,915 | 9/1967 | Wanderer | 264/327 |
| 3,457,339 | 7/1969 | Pall et al. | 264/324 |
| 3,579,805 | 5/1971 | Kast | 285/381 |
| 3,629,389 | 12/1971 | Quackenbush | 264/327 |
| 3,793,427 | 2/1974 | Heisler | 264/252 |
| 3,823,216 | 7/1974 | Petzetakis | 264/89 |
| 3,848,904 | 11/1974 | Anderson | 285/381 |

*Primary Examiner*—Douglas J. Drummond
*Assistant Examiner*—F. Frisenda
*Attorney, Agent, or Firm*—Fitch, Even, Tabin & Luedeka

[57] ABSTRACT

A method for assembling a thermoplastic sleeve coupling onto the end of a pipe is disclosed wherein an end of the coupling is heated to a thermoplastic temperature and is selectively flared whereafter the flared end is assembled onto the end of the pipe and caused to return to substantially its non-flared configuration to compress an adhesive sealant between the coupling and the pipe.

6 Claims, 3 Drawing Figures

METHOD OF ASSEMBLING A THERMOPLASTIC SLEEVE ONTO A PIPE OR THE LIKE

The present invention relates generally to pipe constructions wherein individual lengths of pipe are adapted for connection in end-to-end relation, and more particularly to a novel method for applying a sleeve coupling to the end of a length of clay pipe or the like to adapt the pipe for connection to another length of pipe.

It is known to employ rough piping, such as pipe made out of asbestos-cement or clay, in underground sewage systems for transmitting low pressure fluid. Conventionally, lengths of clay pipe or the like are joined together in end-to-end relation to provide a liquid transmitting line. One of the more common types of pipe used in such sewage systems has a bell-shaped housing at one end of each length of pipe, with the opposite end of each length of pipe having an end adapted to be received within the bell-shaped housing of a similar pipe length laid in end-to-end relation therewith. In practice, the bell-shaped housings are formed of the same material as the length of pipe, such as asbestoscement or clay, and are formed integral with the remaining length of pipe. While such pipe lengths are generally economical to produce, it has been found that the bell-shaped ends are quite easily broken either during production, or during installation or during usage as from the pressure of the earth overlying the buried pipe, all with the result that leakage generally occurs necessitating costly replacement of the broken pipes.

To reduce or eliminate the economic losses resulting from breakage of the relatively fragile bell-shaped housing ends of such prior sewage pipe, a pipe has been developed having coupling means assembled on the opposite ends thereof which allow lengths of the pipe to be coupled in end-to-end relation. The improved pipe has a coupling sleeve assembled on one end and a collar assembled on the opposite end for connection to the coupling sleeve of a similar pipe. The coupling sleeve is made of a thermoplastic material which is heated to a thermoplastic temperature and then inserted over an end of a length of pipe, the coupling being thereafter caused to return to a non-thermoplastic temperature with a corresponding establishment of a tight fit on the end of the pipe. The pipe preferably has an adhesive applied on the end thereof over which the coupling sleeve is assembled to insure a good bond. Such an improved pipe having separate coupling means assembled on the opposite ends thereof is disclosed in U.S. Pat. No. 3,848,904, dated Nov. 19, 1974, to Richard H. Anderson, and assigned to the assignee of the present invention.

While a length of pipe having a coupling sleeve assembled on one end thereof for connection to the collar end of a similar pipe, as disclosed in the referenced U.S. Pat. No. 3,848,904 provides significant advantages over a clay pipe having a bell-shaped housing end formed integral therewith, and particularly in respect to greater resistance to breakage and consequential leakage as experienced with the conventional bell-shaped housings, it has been found that when a separate coupling sleeve is assembled onto a generally cylindrical end surface of a length of pipe having an adhesive or sealant on its end surface, the coupling sleeve tends to wipe or push the adhesive or sealant forwardly of the end of the coupling sleeve so that the desired bonding is not achieved. As a consequence, any imperfections or irregularities in the peripheral surface of the pipe over which the coupling sleeve is received are not filled by the adhesive or sealant, with the result that leaks may develop between the thermoplastic coupling sleeve and the associated peripheral surface of the clay pipe.

In accordance with the present invention, a method for applying a thermoplastic coupling sleeve to the end of a pipe, such as an asbestos-cement or clay pipe, is provided wherein the end of the coupling sleeve to be received over the end of the pipe is heated to a thermoplastic temperature and inserted over a flaring mandrel to flare the end of the coupling to be assembled onto the pipe. After the end of the coupling sleeve is flared as desired, a selected length of the flared end is chilled to maintain the flared configuration as the coupling is inserted onto the end of a pipe having an adhesive sealant on its peripheral surface. The flared end of the coupling sleeve is received over the adhesive. Thereafter, the chilled portion of the flared end is reheated by the residual heat in the non-chilled portion to a temperature sufficient to cause the flared end to return to its non-flared configuration upon cooling due to the "thermal memory" of the coupling material, with the result that the adhesive sealant underlying the coupling sleeve secures and seals the coupling sleeve onto the pipe.

A particular feature of the present invention lies in chilling the flared end of the coupling sleeve, while at a thermoplastic temperature, for a predetermined distance along its length to maintain the flared end configuration during assembly of the coupling sleeve onto an end of a length of pipe. The length of the flared end which is chilled is selected so that the residual heat in the coupling sleeve will again heat the chilled end to a temperature sufficient to cause the flared end to return to its normal non-flared configuration to snugly engage the peripheral surface of the pipe with the adhesive sealant disposed therebetween. The resulting compression of the adhesive sealant causes it to flow and fill any imperfections in the surface of the pipe whereby to make possible the use of a clay pipe with surface imperfections not acceptable in the prior art methods.

Further objects and advantages of the present invention together with the organization and manner of operation thereof will become apparent from the following detailed description of the invention when taken in conjunction with the accompanying drawing wherein like reference numerals designate like elements throughout the several views, and wherein.

Figure 1:
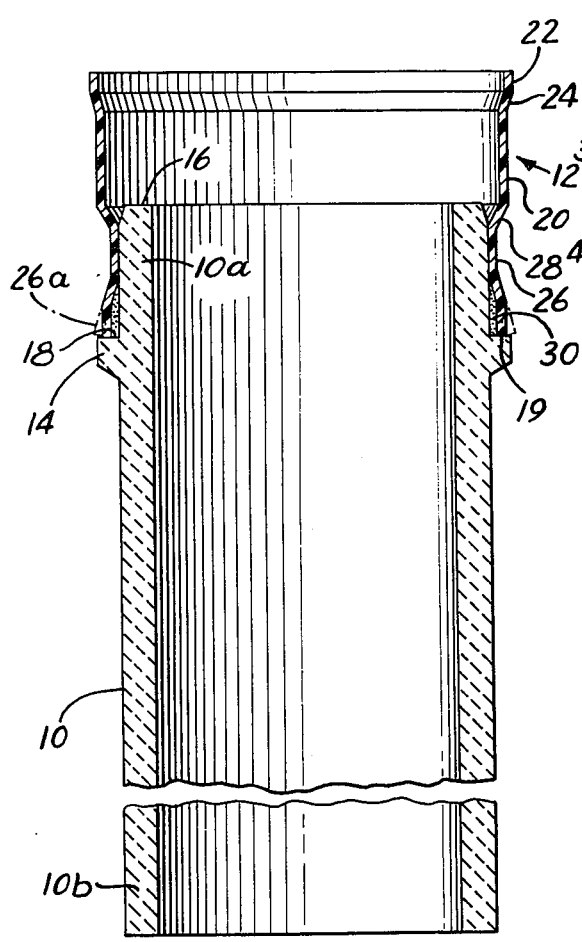
FIG. 1 is a foreshortened longitudinal sectional view of a tubular pipe having a coupling sleeve secured thereon in accordance with the present invention.
Figure 3:
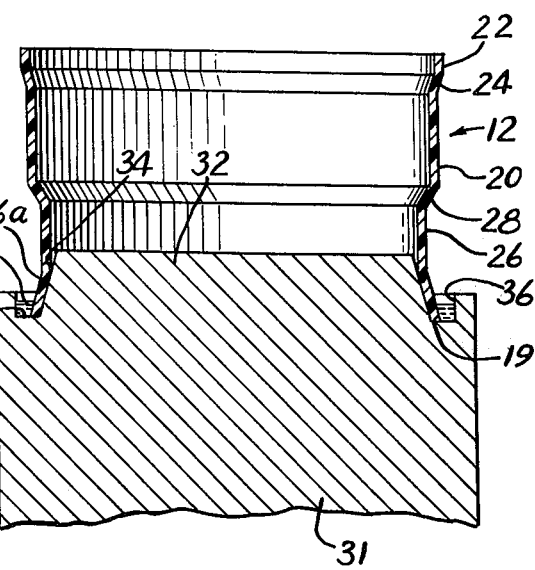
FIG. 3 is a partial longitudinal sectional view showing the coupling sleeve being inserted over a flaring mandrel with the lower end of the coupling sleeve received within a chilling bath provided in the forming mandrel.

With reference to the drawing, a portion of a generally uniformly shaped tubular pipe 10 is illustrated in FIG. 1 having a coupling sleeve, indicated generally at 12, secured on an end 10a thereof in accordance with the present invention. In the illustrated embodiment, the tubular pipe 10 has an annular flange 14 formed on the outer peripheral surface of the pipe, the flange 14 being spaced axially rearwardly from a forward end surface 16 of the pipe and preferably being formed integral with the pipe. The annular flange 14 defines a generally radially disposed annular shoulder surface 18 which provides a stop surface against which an end edge 19 of the coupling sleeve 12 is caused to abut during assembly of the coupling sleeve onto the end of the pipe 10.

The pipe 10 may be extruded from clay or cast from a similar material, which hardens upon curing, and is conventionally of relatively large diameter, typically 4 or more inches. The tubular pipe 10 is generally uniform in wall thickness throughout its length, except for the annular flange 14, and thus can be inexpensively produced by conventional extrusion techniques. The coupling sleeve 12 is made of a thermoplastic material, such as polyvinylchloride, which exhibits the characteristic of "thermal memory". As will be discussed more fully below, other thermoplastic materials may also be employed for the coupling sleeve 12 in carrying out the present invention.

Figure 2:
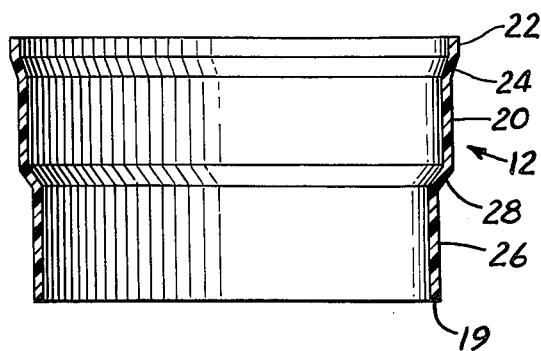
FIG. 2 is a longitudinal sectional view of a coupling sleeve prior to preparation for assembly onto a length of pipe as shown in FIG. 1.

Noting FIG. 2, the coupling sleeve 12 is initially formed with an annular or cylindrical tubular wall portion 20 having an inner diameter sufficient to receive the end 10b of a similar pipe 10 therein or a connecting collar (not shown) as may be assembled on the end 10b of the pipe 10 opposite the coupling sleeve 12, an example of such a collar being indicated at reference numeral 15 in the aforereferenced U.S. Pat. No. 3,848,904. To facilitate entry of such a collar formed on the spigot end 10b of a pipe 10 into the coupling sleeve 12 of the illustrated pipe 10, the coupling sleeve is formed with an enlarged diameter outer annular end wall 22 which is connected to the annular wall portion 20 by an annular web portion 24 formed integral with the annular wall portions 20 and 22.

The coupling sleeve 12 has a reduced diameter annular wall portion 26 disposed axially rearwardly from the annular wall 20, the reduced diameter wall portion 26 being integrally connected to the annular wall 20 through an annular web or wall portion 28. The coupling sleeve 12 may be made from an extruded tube of thermoplastic material that is cut to the desired length at room temperature and then heated to a temperature at which the material is rendered thermoplastic such as between approximately 200° and 300° F. in the case of polyvinylchloride. The hot extruded coupling sleeve section is then placed in a suitable press to form the desired sleeve profile having the different wall diameters to establish the wall sections 20, 22 and 26 and the interconnecting web walls 24 and 28 using suitable male and female dies. The annular wall 26 is formed with an inside diameter of approximately 0.1 inch less than the outside diameter of the end 10a of the pipe 10 onto which the wall 26 is to be assembled.

In the assembly of the coupling sleeve 12 onto the end 10a of the pipe 10, as illustrated in FIG. 1, an adhesive, such as an epoxy or urethane adhesive primer, is applied to the outer peripheral surface of the pipe end 10a between the radial shoulder surface 18 and the outer end surface 16 thereof just prior to mounting the coupling sleeve thereon. In the illustrated embodiment, the adhesive is indicated at 30. The adhesive 30 also serves to fill and seal any voids or other nonuniformities or imperfections in the peripheral surface of the end 10a of the clay pipe 10 upon which the annular wall portion 26 of the coupling sleeve 12 is mounted.

In practice, it has been found that when an adhesive sealant material 30 is applied to the peripheral surface of the end 10a of a pipe 10 and a coupling sleeve, such as shown in FIG. 2, having a cylindrical tubular wall 26 is inserted over the peripheral surface of the end 10a of the pipe, there is a tendency for the adhesive 30 to be extruded or pushed forwardly of the end surface 19 of the coupling sleeve whereby to wipe the adhesive from the surface of the pipe. As a result, the desired adhesive and sealing characteristics of the adhesive 30 are lost.

In accordance with the present invention, a method of assembling the coupling sleeve 12 onto the pipe 10 is accomplished in a manner to prevent such wiping or extrusion of the adhesive material 30 from the surface of the pipe on which the coupling sleeve is mounted. After forming the coupling sleeve 12 to a configuration as shown in FIG. 2, the annular wall portion 26 of the coupling sleeve is heated by suitable heating means, such as by a circulatory air oven or the like, to a temperature in its thermoplastic temperature range. When the coupling sleeve 12 is made of polyvinylchloride, the wall portion 26 of the coupling sleeve may be rendered thermoplastic by heating it to a temperature within the range of approximately 220°F. to 270°F. It will be understood that other thermoplastic materials may be used for the coupling sleeve 12 which have different thermoplastic temperature ranges.

After heating the end wall portion 26 of the coupling sleeve 12 to a thermoplastic temperature within the range of between 220°F to 270°F, the end wall portion 26 of the coupling sleeve is placed over a mandrel, such as indicated at 31 in FIG. 2, which is disposed in a position such that its longitudinal axis extends generally vertically. The mandrel 31 has an upper flaring end portion 32 having a generally uniformly tapered peripheral wall 34 which terminates at its lower edge in an annular groove or recess 36. The annular groove 36 serves as a liquid bath or reservoir to receive water or the like as indicated at 38. The annular groove 36 has a lower annular surface 40 which lies in a plane normal to the longitudinal axis of the mandrel 31 and serves as a base reference surface relative to which the depth of the water liquid 38 may be measured so as to maintain a predetermined depth of water within the annular groove 36. The temperature of the water 38 within the reservoir groove 36 is preferably maintained within a temperature range of approximately 80° F to 110°F.

With the coupling sleeve 12 disposed above and in generally axial alignment with the mandrel 31, the coupling sleeve is moved downwardly such that a lower portion 26a of the annular wall 26 engages the flaring surface 34 on the mandrel 31 and is caused to flare outwardly by continued downward movement of the coupling sleeve onto the flaring surface 34. The coupling sleeve 12 is moved downwardly onto the flaring surface 34 to a position wherein the lowermost edge 19 of the wall portion 26a abuts the lower annular surface 40 in the annular reservoir 36. The flaring surface 34 on the mandrel 31 is of sufficient diameter and vertical height to effect an outward flaring of approximately the lower one-third of the axial length of the wall portion 26 of the coupling sleeve 12. The tapered flaring surface 34 has an angle of incline, termed the flaring angle and considered relative to vertical, sufficient to establish an outward taper of the end portion 26a on the coupling sleeve of approximately 20°, although other flaring angles may be employed dependent upon the "thermal memory" characteristic of the particular material selected for the coupling sleeve 12.

As the coupling sleeve 12 is moved downwardly onto the flaring surface 34 of the mandrel 31 to flare the lower end portion 26a thereof, a predetermined length of the wall portion 26a, considered axially upwardly from the end edge 19, is received within the water chilling liquid disposed within the annular bath or reservoir 36. With the annular wall portion 26 of the coupling sleeve 12 having been heated to a temperature range of between 220°F–270°F, contact of the lower end of the wall portion 26a of the coupling sleeve with the chilling liquid in the annular reservoir 36 will chill the portion of the wall 26a received within the liquid 38 and reduce its temperature to a temperature substantially below its thermoplastic temperature. The annular portion of the wall 26a which is thus chilled serves to maintain the dimension to which it has been deformed by the flaring surface 34 on the mandrel 31 and maintain the flared configuration of the lower end 26a when the coupling sleeve 12 is removed from the mandrel 31. It has been found that chilling a length of approximately ⅛ inch upwardly from the lowermost edge 19 of the annular wall 26 of the coupling sleeve 12 is sufficient to retain the flared end configuration 26a until the coupling sleeve is installed onto the end 10a of a pipe 10. By employing the lower surface 40 of the annular reservoir 36 as a stop surface for abutment with the lowermost edge surface 19 of the annular wall 26 of the coupling sleeve, the desired length of the annular wall 26 to be chilled by the chilling liquid 38 within the annular reservoir 36 may be controlled simply by maintaining the depth of the chilling liquid 38 at such desired dimension, such as the noted ⅛ inch depth.

After flaring the annular wall portion 26a of the coupling sleeve 12 while at a thermoplastic temperature and chilling the lowermost ⅛ inch length thereof to a temperature substantially lower than the thermoplastic temperature, the coupling sleeve 12 is removed from the mandrel 31 and inserted over the end 10a of the pipe 10 whereupon it is moved in a direction toward the annular flange 14. During assembly of the coupling sleeve 12 onto the end of the pipe 10, the flared end portion 26a will maintain its flared condition, shown in phantom in FIG. 1, due to the chilled ring portion thereof. The flared end 26a of the coupling sleeve 12 is received over the adhesive 30, which has previously been applied on the peripheral surface of the end 10a of the pipe 10. In this manner, the adhesive 30 is not wiped from the peripheral surface of the end 10a of the pipe 10 nor is it extruded outwardly between the end 19 of the coupling sleeve and the shoulder surface 18 of the annular flange 14.

After the coupling sleeve 12 has been assembled onto the end 10a of the pipe 10 as described, the residual heat within the annular wall 26 of the coupling sleeve 12 reheats the chilled end of the flared wall portion 26a to a temperature sufficient to cause the flared wall 26a and the formerly chilled end portion to return, upon cooling, to a pre-flared configuration due to its "thermal memory". Such return or reversion of the flared wall 26a toward its non-flared configuration compresses the adhesive 30 underlying the flared end portion against the underlying peripheral surface of the pipe 10.

The return of the flared wall portion 26a of the coupling sleeve 12 to substantially the original diameter of the wall 26 puts the adhesive sealer 30 under compression, causing the adhesive to flow and fill any voids or imperfections in the peripheral surface of the end 10a of the clay pipe 10. The adhesive 30 thus serves to both adhesively secure the coupling sleeve 12 onto the end of the pipe 10 as well as to provide a seal between the outer peripheral surface of the pipe end 10a and the inner surface of the coupling sleeve wall 26 whereby to prevent leakage. The axial length of the flared end wall 26a of the coupling sleeve 12 which is chilled after flaring the end of the coupling sleeve is selected to assure that the residual heat in the annular wall 26 will be sufficient to reheat the chilled end and allow the chilled end and remaining flared wall 26 to shrink back to their normal generally cylindrical shape with a simultaneous compression of the adhesive sealant 30 disposed on the peripheral surface of the pipe end 10a.

The heat deflection temperature of a typical polyvinylchloride material is 130°F to 175°F at a fiber stress of 169 p.s.i. Slightly higher temperatures will permit deflection at lower stress levels. For example, heating the coupling sleeve wall 26 to a temperature within the range of 135°F to 180°F will permit deflection or deforming on the mandrel 30 at approximately 66 p.s.i. Since the coupling sleeve 12 will normally be manually installed or assembled onto the end of a clay pipe, the temperature to which the wall portion 26 of the coupling sleeve is heated is selected sufficiently high enough so that the annular end wall 26 of the coupling sleeve may be installed at lower stress levels. An extrusion grade of acrylonitrile-butadiene-styrene (ABS) has a heat deflection temperature of 210°F to 230°F and, consequently, would require that the material be heated to higher temperatures, for example, over 300°F, to allow manual installation of the coupling sleeve onto the end of a pipe 10. High density polyethylene material might also be used for the coupling sleeve 12.

Alternative materials which may be employed for the coupling sleeve 12 include such materials as high density polyethylene, acetals, acrylics, nylons, poly-butylenes, thermoplastic polyesters, polypropylenes, polystyrenes, and various combinations or alloys of these materials.

It can thus be seen that in accordance with the present invention, a method of assembling a thermoplastic coupling sleeve onto the end of a pipe, such as the illustrated clay pipe 10, is provided which assures that any adhesive or sealant disposed on the peripheral surface of the end of the pipe upon which the coupling sleeve is to be assembled is not wiped from the pipe surface during assembly of the coupling onto the end of the pipe. Additionally, in accordance with the present invention, clay pipe and the like with imperfections not heretofore found passable may be utilized due to the fact that return of the flared end wall portion of the coupling sleeve to its non-flared configuration serves to compress the adhesive sealant into voids or other imperfections in the peripheral surface of the pipe to prevent leakage during usage. Thus, in accordance with the present invention, the clay pipe or the like upon which the coupling sleeves 12 are employed need not be made under as narrow manufacturing tolerances and surface finish requirements as heretofore necessary, thereby resulting in an increase in productivity and economic savings.

While a preferred embodiment of the present invention has been illustrated and described, it will be obvious to those skilled in the art that changes and modifications may be made therein without departing from the invention in its broader aspects. Various features of the invention are defined in the appended claims.

What is claimed is:

1. A method for assembling a thermoplastic tubular sleeve over the end of a pipe or the like, said pipe having an adhesive material disposed on the end thereof received within said sleeve, and said sleeve having an outermost end and an inner peripheral configuration which would normally cause the adhesive material to be wiped along the surface of said pipe forwardly of said outermost end of the sleeve as it is assembled coaxially over the end of the pipe, said method comprising the steps of heating at least the end portion of said sleeve to be received over the end of said pipe to a temperature rendering said heated portion of said sleeve thermoplastic, deforming the outermost end and a first predetermined axial length of said heated end of said sleeve to a configuration having an inner surface circumference greater than the outer surface circumference of said end of said pipe so that said deformed end of said sleeve may be received over said end of said pipe and said adhesive material disposed thereon without wiping said adhesive along said end of said pipe, reducing the temperature of said outermost end and a contiguous second predetermined axial length of said heated end of said sleeve to a temperature below said thermoplastic temperature to maintain said deformed configuration of said first predetermined length of said sleeve, assembling said deformed end of said sleeve coaxially onto said end of said pipe member so that at least said outermost end and a portion of said deformed length of said sleeve is received over said adhesive material disposed on said pipe, and causing said deformed end of said sleeve to return to a substantially non-deformed configuration to compress said adhesive material between the inner peripheral surface of said sleeve and the outer peripheral surface of said end of said pipe.

2. The method as defined in claim 1 wherein said step of heating said end portion of said sleeve comprises heating a sufficient portion of said sleeve to establish a source of residual heat capable of causing said second predetermined axial length of said sleeve to return to a thermoplastic temperature after assembling said sleeve onto said pipe such that said deformed end portion of said sleeve may thereafter return to a substantially non-deformed configuration upon cooling due to the thermal memory of the sleeve material.

3. The method as defined in claim 1 wherein said step of deforming said first predetermined axial length of said sleeve comprises forcing said first axial length of said sleeve over a mandrel having a tapered flaring surface thereon adapted to effect an outward flaring of said first predetermined length of the sleeve.

4. The method as defined in claim 3 wherein said step of reducing the temperature of a second predetermined axial length of said sleeve is accomplished by submerging said second predetermined axial length of said sleeve into a chilling liquid substantially simultaneously with flaring said first predetermined length of said sleeve.

5. The method as defined in claim 1 wherein said step of reducing the temperature of said second predetermined axial length of said sleeve comprises quenching said second predetermined axial length of said sleeve to a temperature substantially below the thermoplastic temperature to which said end portion of said sleeve was heated prior to deforming first predetermined length of said sleeve whereby to maintain said deformed length of said sleeve in its deformed configuration until it is again heated to a thermoplastic temperature by the residual heat retained in said sleeve.

6. A method for assembling a thermoplastic coupling sleeve having a generally cylindrical tubular end portion onto an end of a cylindrical pipe having an adhesive applied onto the peripheral surface of said pipe end, said tubular end portion of said coupling sleeve having a normal configuration sufficient to cause said adhesive to be wiped from said surface of said pipe by the leading edge of said sleeve when assembled onto said pipe while said coupling sleeve is in its said normal configuration, said method comprising the steps of; heating at least the end portion of said sleeve to be received over said end of said pipe to a temperature sufficient to render said end portion of said sleeve thermoplastic, flaring a first predetermined axial length of the heated end of said sleeve to a configuration sufficient to be received over said end of said pipe and the adhesive material disposed thereon without wiping said adhesive from said surface of said pipe, cooling a second predetermined axial length of said flared length of said sleeve less than said first axial length to a temperature substantially below said thermoplastic temperature of said end portion of said sleeve to retain said flared configuration, assembling said heated end portion of said sleeve coaxially onto said end of said pipe so that at least said flared end portion of said sleeve is received over said adhesive material disposed on said pipe, causing said cooled length of said sleeve to be raised to a thermoplastic temperature by the residual heat within said remaining heated end portion of said sleeve, and thereafter allowing all of said heated end portion of said sleeve to cool to ambient temperature such that said flared end portion thereof returns to substantially its normal configuration to compress said adhesive disposed between said sleeve and said pipe.

* * * * *